US012621107B2

(12) United States Patent
Yang et al.

(10) Patent No.: US 12,621,107 B2
(45) Date of Patent: May 5, 2026

(54) SYSTEM AND METHOD FOR SIDELINK CONFIGURATION

(71) Applicant: ZTE CORPORATION, Shenzhen (CN)

(72) Inventors: Jin Yang, Shenzhen (CN); Youxiong Lu, Shenzhen (CN); Weimin Xing, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 239 days.

(21) Appl. No.: 17/873,913

(22) Filed: Jul. 26, 2022

(65) Prior Publication Data

US 2022/0360409 A1     Nov. 10, 2022

Related U.S. Application Data

(63) Continuation of application No. PCT/CN2020/079732, filed on Mar. 17, 2020.

(51) Int. Cl.
H04L 5/00     (2006.01)

(52) U.S. Cl.
CPC ................................. H04L 5/0053 (2013.01)

(58) Field of Classification Search
CPC .................................................... H04L 5/0053
See application file for complete search history.

(56) References Cited

U.S. PATENT DOCUMENTS

2018/0213379 A1*   7/2018   Xiong ..................... H04W 4/70
2019/0280836 A1    9/2019   Bhattad et al.

2020/0328852 A1   10/2020   Tang et al.
2021/0160852 A1*   5/2021   Zhao ................... H04W 72/044
2021/0219320 A1*   7/2021   Belleschi ............. H04W 72/20
2022/0095277 A1*   3/2022   Aiba ..................... H04W 72/20

FOREIGN PATENT DOCUMENTS

| | | |
|---|---|---|
| CN | 110115080 A | 8/2019 |
| CN | 110383866 A | 10/2019 |
| CN | 110830952 A | 2/2020 |
| WO | WO-2016/163972 A1 | 10/2016 |
| WO | WO-2019/028900 A1 | 2/2019 |
| WO | WO-2019/128261 A1 | 7/2019 |
| WO | WO-2020/011229 A1 | 1/2020 |
| WO | WO-2020/011336 A1 | 1/2020 |
| WO | WO-2020/034326 A1 | 2/2020 |

(Continued)

OTHER PUBLICATIONS

International Search Report and Written Opinion for PCT Appl. No. PCT/CN2020/079732 dated Dec. 25, 2020 (8 pages).

(Continued)

*Primary Examiner* — Kevin M Cunningham

(74) *Attorney, Agent, or Firm* — Foley & Lardner LLP

(57)     ABSTRACT

A system and method for sidelink configuration are disclosed herein. In one embodiment, the system and method are configured to transmit, by a first wireless communication device, information required to form a resource set report. The system and method are also configured to receive by the first wireless communication device, the resource set report indicating a set of resources, wherein the set of resources are selected according to the required information.

16 Claims, 6 Drawing Sheets

(56) References Cited

FOREIGN PATENT DOCUMENTS

WO     WO-2020/035142 A1     2/2020

OTHER PUBLICATIONS

LG Electronics: "New WID on NR sidelink enhancement" 3GPP
TSG RAN Meeting #86; RP-193231; Dec. 12, 2019; Sitges, Spain
(6 pages).
Extended European Search Report for EP Appl. No. 20890842.6,
dated Nov. 25, 2022 (8 pages).
First Office Action on CN Appln No. 2020800980624, mailed Feb.
28, 2025 (9 pages including English translation).
Spreadtrum Communications, "Negotiation of TX resource pool(s)
for SL unicast", 3GPP TSG-RAN WG2 Meeting #106, R2-1905677,
May 17, 2019, Reno, US (2 pages).
Second Office Action for CN Appl. No. 202080098062.4, dated Jun.
30, 2025 (with English translation, 10 pages).

* cited by examiner

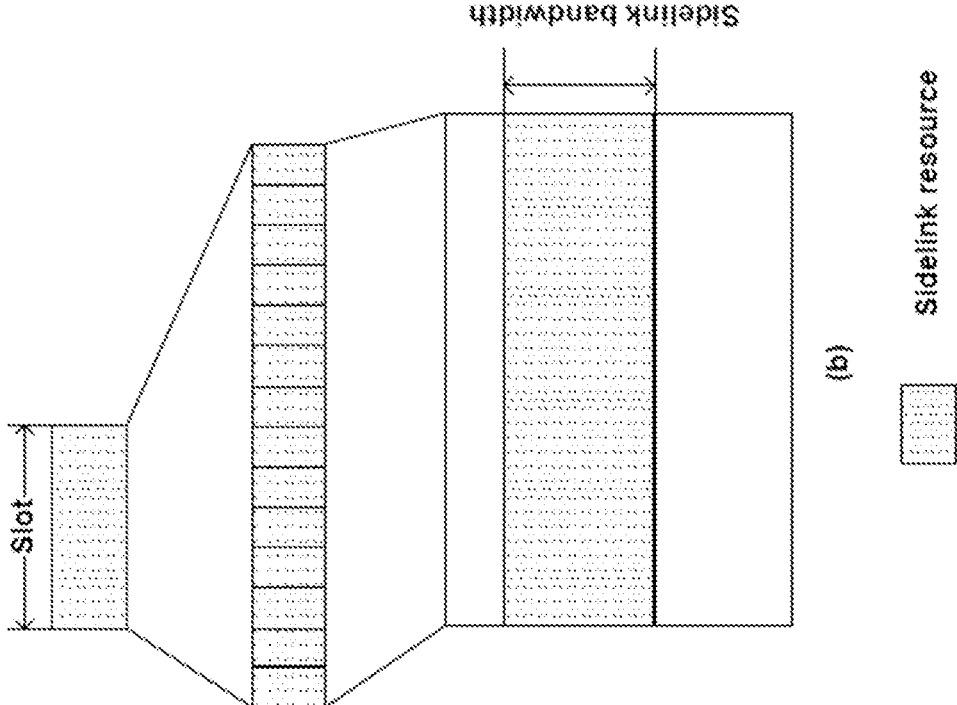
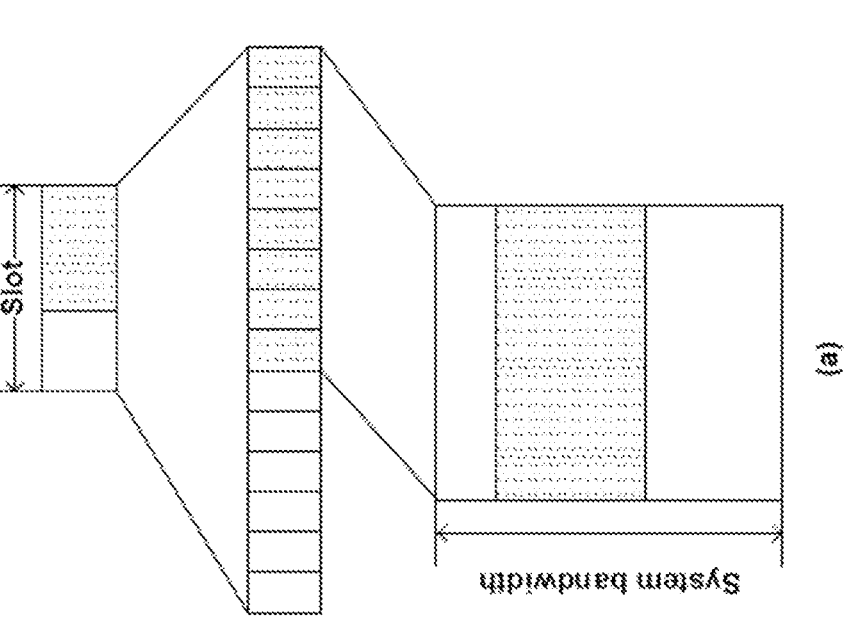
FIG. 4

SYSTEM AND METHOD FOR SIDELINK CONFIGURATION

CROSS-REFERENCE TO RELATED APPLICATION

This application claims the benefit of priority under 35 U.S.C. § 120 as a continuation of PCT Patent Application No. PCT/CN2020/079732, filed on Mar. 17, 2020, the disclosure of which is incorporated herein by reference in its entirety.

TECHNICAL FIELD

The disclosure relates generally to wireless communications and, more particularly, to systems and methods for sidelink configuration.

BACKGROUND

Sidelink (SL) communication is a wireless radio communication directly between two or more user equipment devices (hereinafter "UE"). In this type of communication, two or more UEs that are geographically proximate to each other can directly communicate without going through an eNode or a base station (hereinafter "BS"), or a core network. Data transmission in sidelink communications is thus different from typical cellular network communications, which transmit data to a BS (i.e., uplink transmissions) or receive date from a BS (i.e., downlink transmissions). In sidelink communications, data is transmitted directly from a source UE to a target UE through the Unified Air Interface, e.g., PC5 interface, without passing through a BS SL communication can help save radio spectrum resources, reduce data transmission pressure on the network, reduce system resource consumption, increase spectral efficiency, reduce transmission power consumption and/or improve network operation costs.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication device includes transmitting, by a first wireless communication device, information required to form a resource set report; and receiving, by the first wireless communication device, the resource set report indicating a set of resources, wherein the set of resources are selected according to the required information.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 4 illustrates a schematic diagram of an exemplary configuration of a sidelink resource pool.

FIG. 6 illustrates an example implementation of a second UE performing sensing on an assigned resource pool according to indicated sensing parameters, in accordance with exemplary embodiment #2 of the present disclosure.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein.

Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1A:
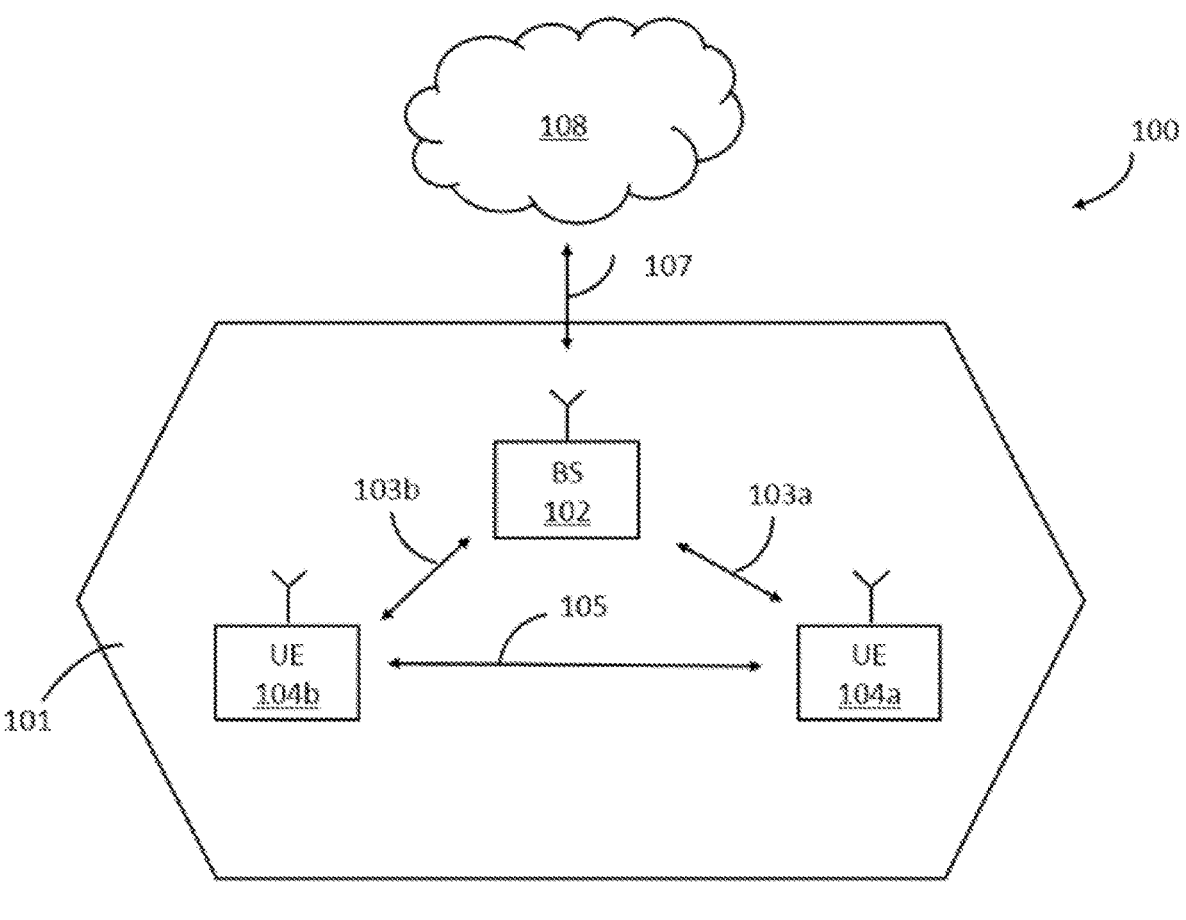
FIG. 1A illustrates an example wireless communication network, in accordance with an embodiment of the present disclosure.

Referring to FIG. 1A, an example wireless communication network 100 is shown. The wireless communication network 100 illustrates a group communication within a cellular network. In a wireless communication system, a network side communication node or a base station (BS) can include a next Generation Node B (gNB), an E-utran Node B (also known as Evolved Node B, eNodeB or eNB), a pico station, a femto station, a Transmission/Reception Point (TRP), an Access Point (AP), a Multi-cell Coordinating Entity (MCE), a Gateway (GW), a Mobility Management Entity (MME), an Evolved Universal Terrestrial Radio Access Network (EUTRAN), a Next Generation Radio Access Network (NG-RAN), Operations, Administration and Management (OAM) or the like. A terminal side node or a user equipment (UE) can include a long range communication system such as, for example, a mobile device, a smart phone, a personal digital assistant (PDA), a tablet, a laptop computer, or a short range communication system such as, for example a wearable device, a vehicle with a vehicular communication system, or the like. In FIG. 1A, a network side and a terminal side communication node are represented by a BS 102 and a UE 104*a* or 104*b*, respectively, and in the embodiments in this disclosure hereafter. In some embodiments, the BS 102 and UE 104*a*/104*b* are sometimes referred to as "wireless communication node" and "wireless communication device," respectively. Such communication nodes/devices can perform wireless and/or wired communications.

In the illustrated embodiment of FIG. 1A, the BS 102 can define a cell 101 in which the UEs 104*a-b* are located. The UE 104*a* can include a vehicle that is moving within a coverage of the cell 101. The UE 104*a* can communicate with the BS 102 via a communication channel 103*a*. Similarly, the UE 104*b* can communicate with the BS 102 via a communication channel 103*b*. In addition, the UEs 104*a-b* can communicate with each other via a communication channel 105. The communication channels (e.g., 103*a-b*) between the UE and the BS can be through interfaces such as an Uu interface, which is also known as UMTS (Universal Mobile Telecommunication System (UMTS) air interface. The communication channels (e.g., 105) between the UEs can be through a PC5 interface, which is introduced to address high moving speed and high density applications such as, for example, Vehicle-to-Vehicle (V2V) communications, Vehicle-to-Pedestrian (V2P) communications, Vehicle-to-Infrastructure (V2I) communications, Vehicle-to-Network (V2N) communications, or the like. In some instances, such car network communications modes can be collective referred to as Vehicle-to-Everything (V2X) communications. It is appreciated that the communications channels between the UEs can be used in Device-to-Device (D2D) communications while remaining within the scope of the present disclosure. The BS 102 is connected to a core network (CN) 108 through an external interface 107, e.g., an Iu interface.

Figure 1B:
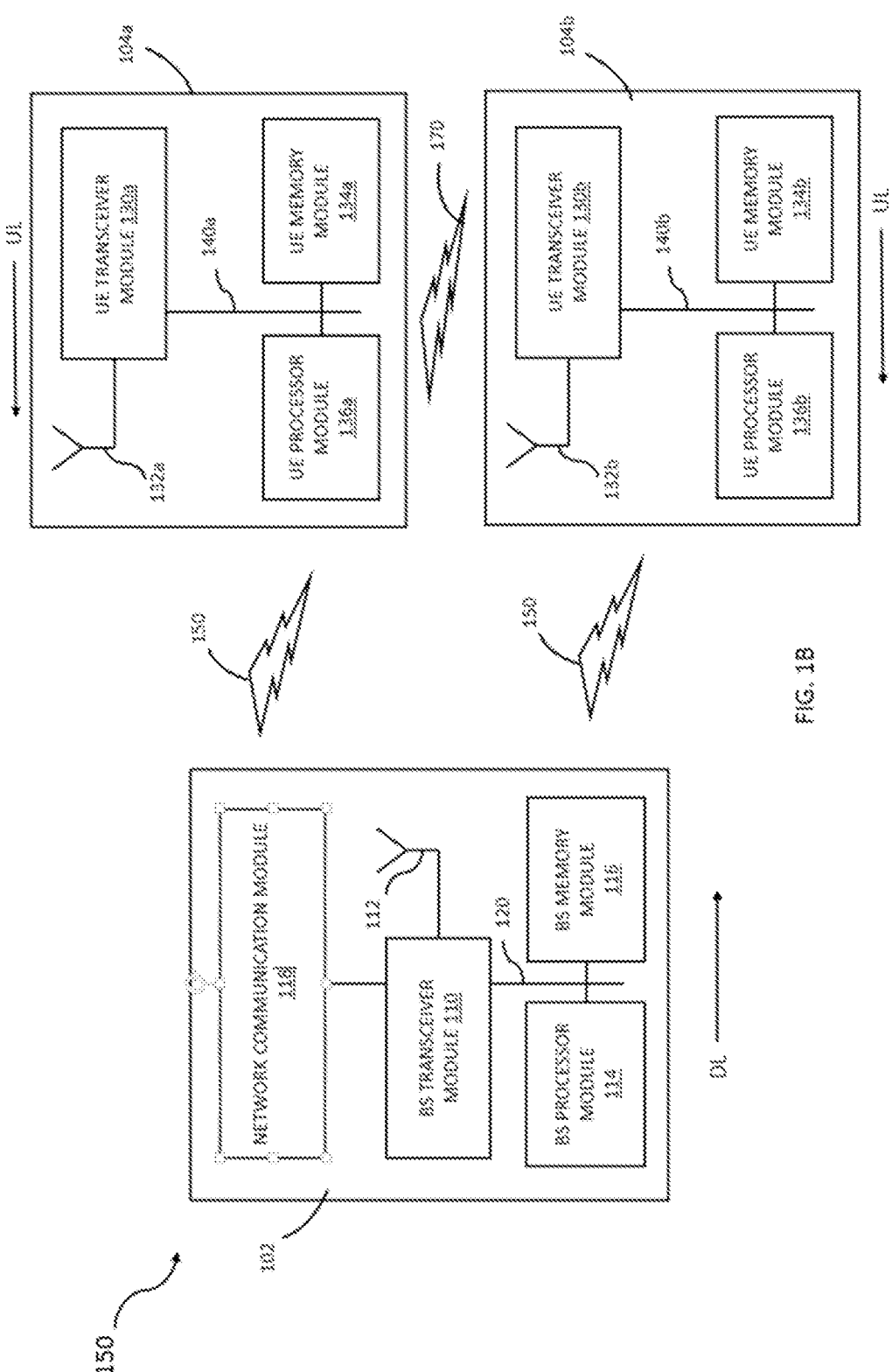
FIG. 1B illustrates a block diagram of an example wireless communication system for transmitting and receiving downlink, uplink, and/or SL communication signals, in accordance with some embodiments of the present disclosure.

FIG. 1B illustrates a block diagram of an example wireless communication system 150 for transmitting and receiving downlink, uplink and sidelink communication signals, in accordance with some embodiments of the present disclosure. The system 150 may include components and elements configured to support known or conventional operating features that need not be described in detail herein. In one embodiment, the system 150 can transmit and receive data symbols in a wireless communication environment such as the wireless communication network 100 of FIG. 1A, as described above.

The system 150 generally includes the BS 102 and UEs 104*a-b*, as described in FIG. 1A. The BS 102 includes a BS transceiver module 110, a BS antenna 112, a BS memory module 116, a BS processor module 114, and a network communication module 118, each module being coupled and interconnected with one another as necessary via a data communication bus 120. The UE 104*a* includes a UE transceiver module 130*a*, a UE antenna 132*a*, a UE memory module 134*a*, and a UE processor module 136*a*, each module being coupled and interconnected with one another as necessary via a data communication bus 140*a*. Similarly, the UE 104*b* includes a UE transceiver module 130*b*, a UE antenna 132*b*, a UE memory module 134*b*, and a UE processor module 136*b*, each module being coupled and interconnected with one another as necessary via a data communication bus 140*b*. The BS 102 communicates with the UEs 104*a-b* via one or more of a communication channel 150, which can be any wireless channel or other medium known in the art suitable for transmission of data as described herein.

As would be understood by persons of ordinary skill in the art, the system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present disclosure.

A wireless transmission from an antenna of one of the UEs 104*a-b* to an antenna of the BS 102 is known as an uplink transmission, and a wireless transmission from an antenna of the BS 102 to an antenna of one of the UEs 104*a-b* is known as a downlink transmission. In accordance with some embodiments, each of the UE transceiver modules 130*a-b* may be referred to herein as an uplink transceiver, or UE transceiver. The uplink transceiver can include a transmitter and receiver circuitry that are each coupled to the respective antenna 132*a-b*. A duplex switch may alternatively couple the uplink transmitter or receiver to the uplink antenna in time duplex fashion. Similarly, the BS transceiver module 110 may be herein referred to as a downlink transceiver, or BS transceiver. The downlink transceiver can include RF transmitter and receiver circuitry that are each coupled to the antenna 112. A downlink duplex switch may alternatively couple the downlink transmitter or receiver to the antenna 112 in time duplex fashion. The operations of the transceivers 110 and 130*a-b* are coordinated in time such that the uplink receiver is coupled to the antenna 132*a-b* for reception of transmissions over the wireless communication channel 150 at the same time that the downlink transmitter is coupled to the antenna 112. In some embodiments, the UEs 104*a-b* can use the UE transceivers 130*a-b* through the respective antennas 132*a-b* to communicate with the BS 102 via the wireless communication channel 150. The wireless communication channel 150 can be any wireless channel or other medium known in the art suitable for downlink (DL) and/or uplink (UL) transmission of data as described herein. The UEs 104*a-b* can communicate with each other via a wireless communication channel 170. The wireless communication channel 170 can be any wireless channel or other medium known in the art suitable for sidelink transmission of data as described herein.

Each of the UE transceiver 130*a-b* and the BS transceiver 110 are configured to communicate via the wireless data communication channel 150, and cooperate with a suitably configured antenna arrangement that can support a particular wireless communication protocol and modulation scheme. In some embodiments, the UE transceiver 130*a-b* and the BS transceiver 110 are configured to support industry standards such as the Long Term Evolution (LTE) and emerging 5G standards, or the like. It is understood, however, that the present disclosure is not necessarily limited in application to a particular standard and associated protocols. Rather, the UE transceiver 130*a-b* and the BS transceiver 110 may be configured to support alternate, or additional, wireless data communication protocols, including future standards or variations thereof.

The processor modules 136*a-b* and 114 may be each implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 114 and 136*a-b*, respectively, or in any practical combination thereof. The memory modules 116 and 134*a-b* may be realized as RAM memory, flash memory, ROM memory, EPROM memory, EEPROM memory, registers, a hard disk, a removable disk, a CD-ROM, or any other form of storage medium known in the art. In this regard, the memory modules 116 and 134*a-b* may be coupled to the processor modules 114 and 136*a-b*, respectively, such that the processors modules 114 and 136*a-b* can read information from, and write information to, memory modules 116 and 134*a-b*, respectively. The memory modules 116 and 134*a-b* may also be integrated into their respective processor modules 114 and 136*a-b*. In some embodiments, the memory modules 116 and 134*a-b* may each include a cache memory for storing temporary variables or other intermediate information during execution of instructions to be executed by processor modules 114 and 136*a-b*, respectively. Memory modules 116 and 134*a-b* may also each include non-volatile memory for storing instructions to be executed by the processor modules 114 and 136*a-b*, respectively.

The network interface 118 generally represents the hardware, software, firmware, processing logic, and/or other components of the B S 102 that enable bi-directional communication between BS transceiver 110 and other network components and communication nodes configured to communication with the BS 102. For example, the network interface 118 may be configured to support internet or WiMAX traffic. In a typical deployment, without limitation, the network interface 118 provides an 802.3 Ethernet interface such that BS transceiver 110 can communicate with a conventional Ethernet based computer network. In this manner, the network interface 118 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 118 can allow the BS 102 to communicate with other BSs or core network over a wired or wireless connection.

In some embodiments, each of the UEs 104*a-b* can operate in a hybrid communication network in which the UE communicates with the BS 102, and with other UEs, e.g., between 104*a* and 104*b*. As described in further detail below, the UEs 104*a-b* support sidelink communications with other UE's as well as downlink/uplink communications between the BS 102 and the UEs 104*a-b*. In general, the sidelink communication allows the UEs 104*a-b* to establish a direct communication link with each other, or with other UEs from different cells, without requiring the BS 102 to relay data between UEs.

In general, the allocation of SL communication resources is based on "resource pools", formed by: a "slot/subframe pool" in time domain, including slots/subframes which can be used for the sidelink, and a "resource block pool" in frequency domain, including the resource blocks which can be used for the SL. In some embodiments, the minimum resource unit in time domain may be a symbol, including Cyclic Prefix-Orthogonal Frequency Division Multiplex (CP-OFDM) and Discrete Fourier Transform Spread OFDM (DFT-S-OFDM). Further, a basic resource unit in time domain may be a slot, which may contain 12 symbols for extended cyclic prefix (ECP) or 14 symbols for normal cyclic prefix (NCP). In a slot within a SL resource pool, part of the symbols or all of the symbols of the slot may be configured as a SL resource. In the frequency domain, the minimum resource unit is a sub-carrier. In some embodiments, each sub-carrier may contain 15 kHz, 30 kHz, 60 kHz, 120 kHz or 240 kHz. Multiple sub-carriers in a slot (for example, a slot including 12 sub-carriers, 24 sub-carriers or the like) may be referred to as a resource block (RB). In the frequency domain, part of the system bandwidth may be assigned as a SL resource.

The SL resource pool may include one or more slots in the time domain, and one or more RBs in the frequency domain. The slots contained in a SL resource pool may be continuous or discontinuous. The RBs contained in a SL resource pool may be continuous or discontinuous.

Two types of resource pools are defined for transmission and reception: a transmission (Tx) resource pool includes the candidate resources that may be used for UE's SL Tx, and a receiving (Rx) resource pool includes the candidate resources that UE may use to detect/receive other UE's SL signal. A SL resource pool includes resources used for at least one of the following: SL control, data, and feedback information. The resource pool may be configured by the network side through high layer signaling or system pre-configuration. UEs can support multiple resource pools interleaved in time domain.

A SL resource pool includes one or more types of the following resources: physical sidelink control channel (PSCCH), which may be used for SL control information, physical sidelink shared channel (PSSCH), which may be used for SL data transmission, and physical sidelink feedback channel (PSFCH), which may be used for SL feedback information transmission. The UE may use a PSCCH resource to send a first stage SL control information ($1^{st}$ stage SCI) message, which may be used to indicate a second stage SCI ($2^{nd}$ stage SCI) configuration and/or relevant PSSCH resource allocation and other associated control information. The UE may use a PSSCH resource to send SL data and/or the $2^{nd}$ stage SCI. The UE may use a PSFCH resource to send SL ACK/NACK information.

When UEs communicate on SL, transmitting UE (Tx UE) selects SL resources within a resource pool without any information from receiving UE (Rx UE). Tx UE may use SL resources within assigned resource pools according to the scheduling that the Tx UE determines, or that the network determines. In the situation where the Tx UE selects SL resources, Tx UE performs sensing within the SL resource pool to select resources with less conflict and higher quality. For example, if Tx UE needs to use two sub-channels as PSSCH resources to transmit its SL data, then Tx UE may use two sub-channels as candidate resource size to measure all the available sub-channels in a resource pool. Subsequently, Tx UE may select a suitable resource for its SL transmission. During the sending and resource selecting processes, Tx UE is limited to measuring the channel status that Tx UE senses; in other words, Tx UE does not consider the resources of Rx UE. Thus, the resources selected using traditional SL resource schemes may be less efficient. The present disclosure is concerned with providing a coordination scheme between Tx UE and Rx UE to assist Tx UE in selecting better resources for SL communication.

2. Creating a Coordination Scheme Among UEs

Figure 2:
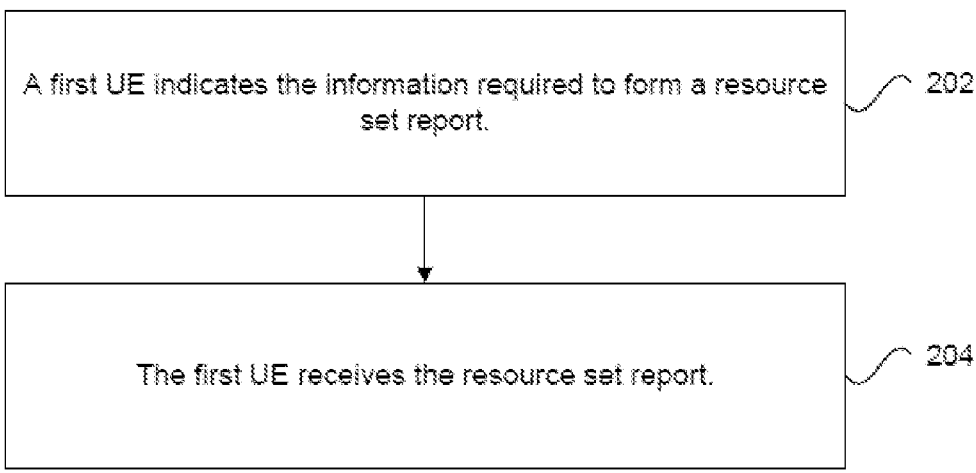
FIG. 2 illustrates a flow chart of an exemplary method of the first UE indicating information to form a resource set report, in accordance with some embodiments of the present disclosure.

FIG. 2 illustrates a flow chart of an exemplary method of the first UE indicating information to form a resource set report, in accordance with some embodiments of the present disclosure. In some embodiments, the first UE may create a coordination scheme for SL communication with one or several UEs. At block 202, the first UE indicates information about SL resource sensing and/or requirements of one or more resource sets of the first UE. In other words, the first UE provides information to form a resource set report. The one or more UEs may form a resource set report with the information provided from the first UE. At block 204, the first UE receives the resource set report, the resource set report being an indication from the second UE of a set of resources to use for SL communication. The set of resources is selected according to information from the first UE. In some embodiments, the first UE may be a Tx UE and the second UE may be an Rx UE on SL.

In some embodiments, information to form a resource set report may include at least one of the following: the configuration of sensing resource pool, the configuration of the sensing parameters, the configuration of the resource set report format, and/or the configuration of resources for the resource set report.

In some embodiments, the information to form a resource set report may be indicated in a first configuration. The first configuration may include one or more resource pools from which the set of resources may be selected. The one or more resource pools may be indicated by respective indices of a list included in the first configuration.

In some embodiments, information to form a resource set report may be indicated in a second configuration. The second configuration may include one or more sets of sensing parameters. The sets of sensing parameters may be configured to measure the set of resources in the one or more resource pools. The one or more sets of sensing parameters may be indicated by respective indices of a list included in the second configuration.

In some embodiments, information to form a resource set report may be indicated in a third configuration. The third configuration may indicate one or more formats of the resource set report. The one or more formats of the resource set report may be indicated by respective indices of a list included in the third configuration.

In some embodiments, information to form a resource set report may be indicated in a fourth configuration. The fourth configuration may indicate one or more resources assigned for transmitting the resource set report.

In some embodiments, the first UE indicates the information to form a resource set report through Radio Resource Control (RRC) messages and/or SCI. In some embodiments, the first UE may broadcast the information on SL. In some embodiments, the first UE may groupcast (or multi-cast) the information in a SL group in which only member UEs of the group can receive the information. In some embodiments, the first UE may unicast the information to the second UE.

3. The Configuration of the Sensing Resource Pool

Referring to FIG. 2, the information to form a resource set report may include the configuration of the sensing resource pool. The configuration of the sensing resource pool may assign one or more SL resource pools which can be used for sensing. The configuration of each resource pool may include: resource pool period, slots included in one period, symbol allocation within a slot, RBs included in the resource pool, sub-channel size, PSCCH resource units, and/or PSSCH Demodulation Reference Signal (PSSCH DMRS) pattern(s). The resource pool assigned by the configuration of sensing resource pools is a SL resource pool which may contain PSCCH, PSSCH and/or PSFCH resources. The assigned resource pool may be a transmitting resource pool of the first UE, a receiving resource pool of the first UE, a receiving resource pool of the second UE, and the like. According to the configuration of the sensing resource pool, the second UE may perform sensing on the assigned resource pool(s). Specifically, when more than one sensing resource pools are configured by the first UE, the second UE may perform sensing on one or more resource pools of the assigned resource pools.

In some embodiments, more than one resource pool may be configured as a sensing resource pool. In these situations, the assigned resource pools may be set as a sensing resource pool list. In a sensing resource pool list, each resource pool has a unique resource pool index. By indicating the resource pool index, the UEs may identify the corresponding resource pool in the sensing resource pool list.

4. Exemplary Embodiment #1

Figure 3:
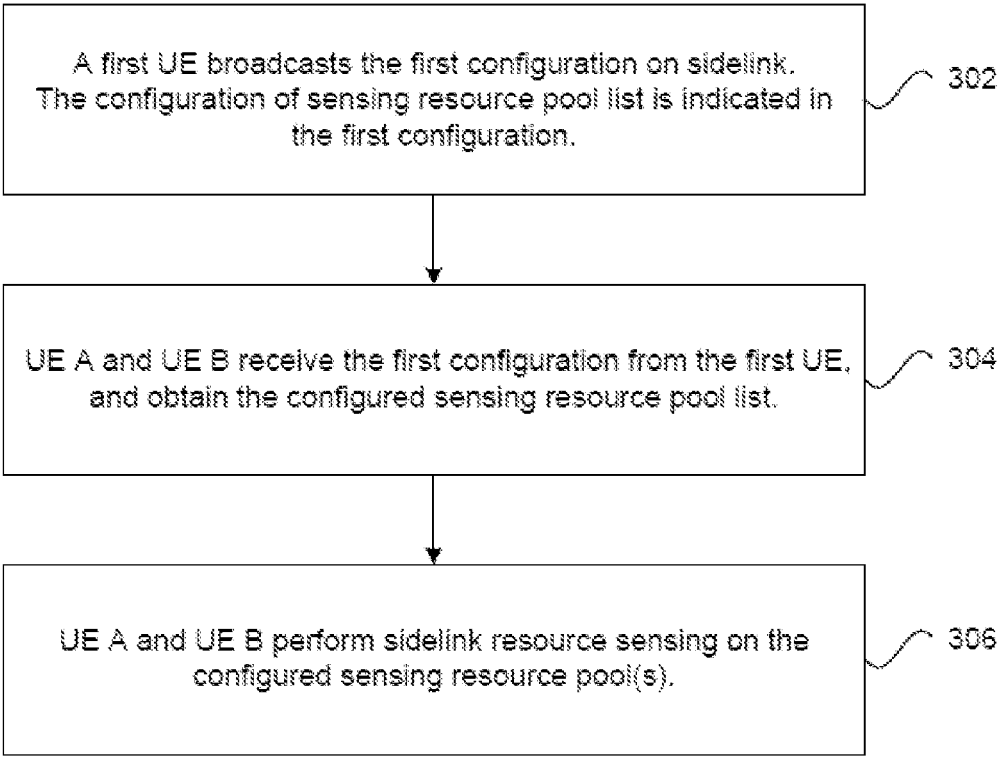
FIG. 3 illustrates a flow chart of exemplary embodiment #1.

FIG. 3 illustrates a flow chart of exemplary embodiment #1. In block 302, a first UE indicates a first configuration by broadcast on SL. The first configuration includes the configuration of a sensing resource pool list. The SL resources are contained in the sensing resource pool list. In block 304, UE A and UE B receive the first configuration on SL and obtain the assigned resource pool list. In block 306, based on the configuration, UE A performs sensing on all the resource pools included in the sensing resource pool list, while UE B performs sensing on resource pool index #1 in the sensing resource pool list according to the ability of UE B.

5. The Configuration of the Sensing Parameter

Referring to FIG. 2, the information to form a resource set report may include the configuration of the sensing parameter. Traditionally, sensing parameters were determined only according to the SL data transmission requirements of the first UE. These sensing parameters were subsequently used for selecting resources for SL data transmission. The present disclosure uses the sensing parameters determined by the first UE during sensing in the second UE. The indicated sensing parameters may be used by the second UE to perform SL resource sensing during the second UE's sensing procedures on the assigned resource pool(s). According to the result of sensing, the second UE may select candidate resource(s) which satisfy the requirement of the first UE, but may be more suitable for the second UE. The selected candidate resource(s) may be PSCCH and/or PSSCH resource(s) in the resource pool. The selected candidate resources corresponding to one set of sensing parameters may be called a resource set.

The sensing parameter may include one or more sets of sensing parameters. One set of the sensing parameters may include at least one of the following: candidate resource period, candidate resource size, priority, Reference Signal Received Power (RSRP) threshold, retransmission number, retransmission interval, quantity of candidate resources in a resource set, quantity of resources for one service, and/or time window.

The candidate resource period may indicate the period of the resource selected by the second UE. In other words, multiple resources with assigned periods may be marked as candidate resources. In some embodiments, the candidate resource period may be the period of data which the first UE needs to transmit on SL.

The candidate resource size may indicate the number of sub-channels used as one candidate resource of PSSCH. See for example, FIG. 4. FIG. 4 illustrates a schematic diagram of an exemplary configuration of a sidelink resource pool. Case (a) shows the configuration that part of the symbol in a slot is assigned as a SL resource. Case (b) shows the configuration that all of the symbols in a slot are assigned as a SL resource.

Figure 5:
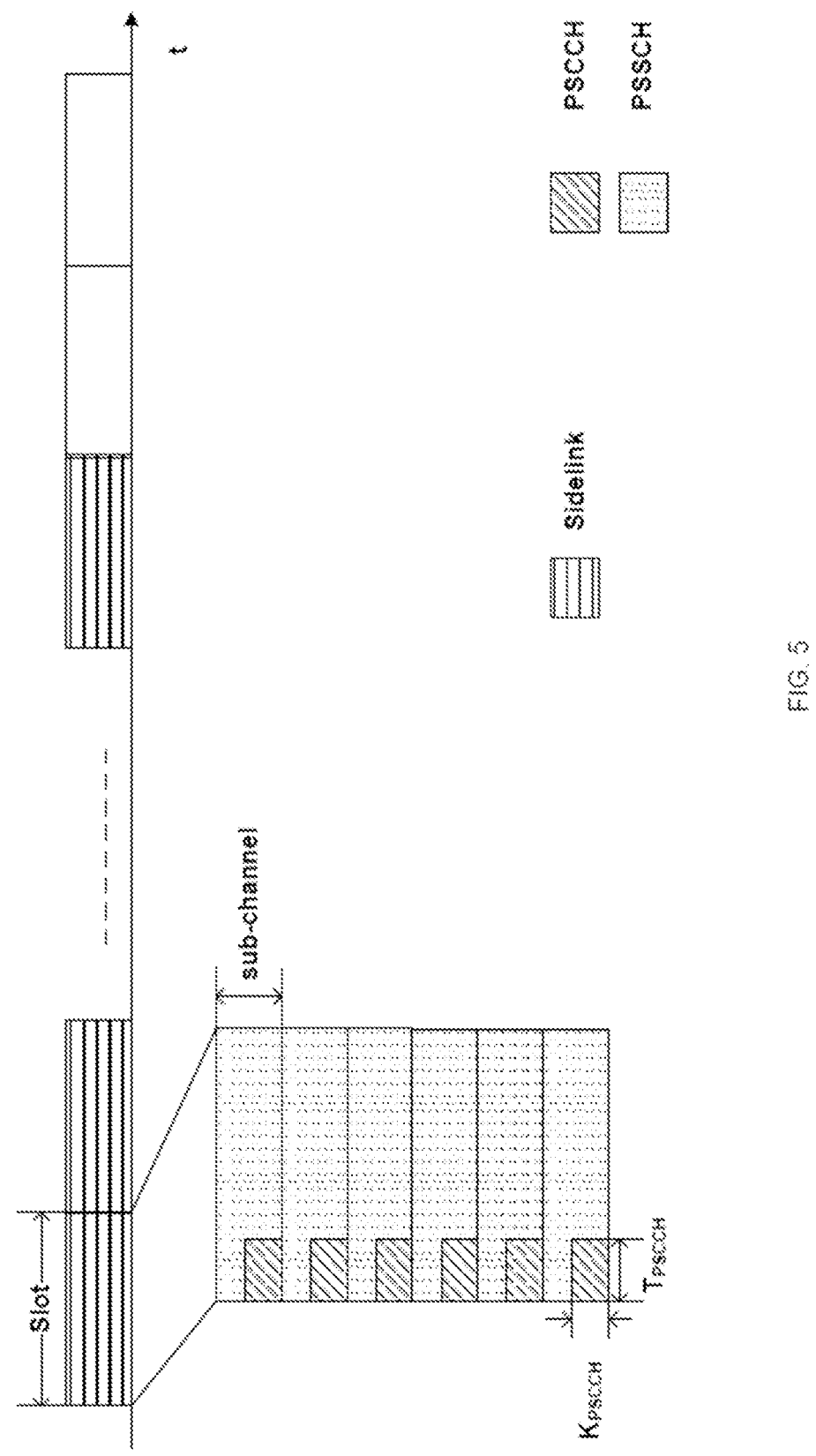
FIG. 5 illustrates a schematic diagram of an exemplary configuration of a sidelink resource pool.
Figure 8:
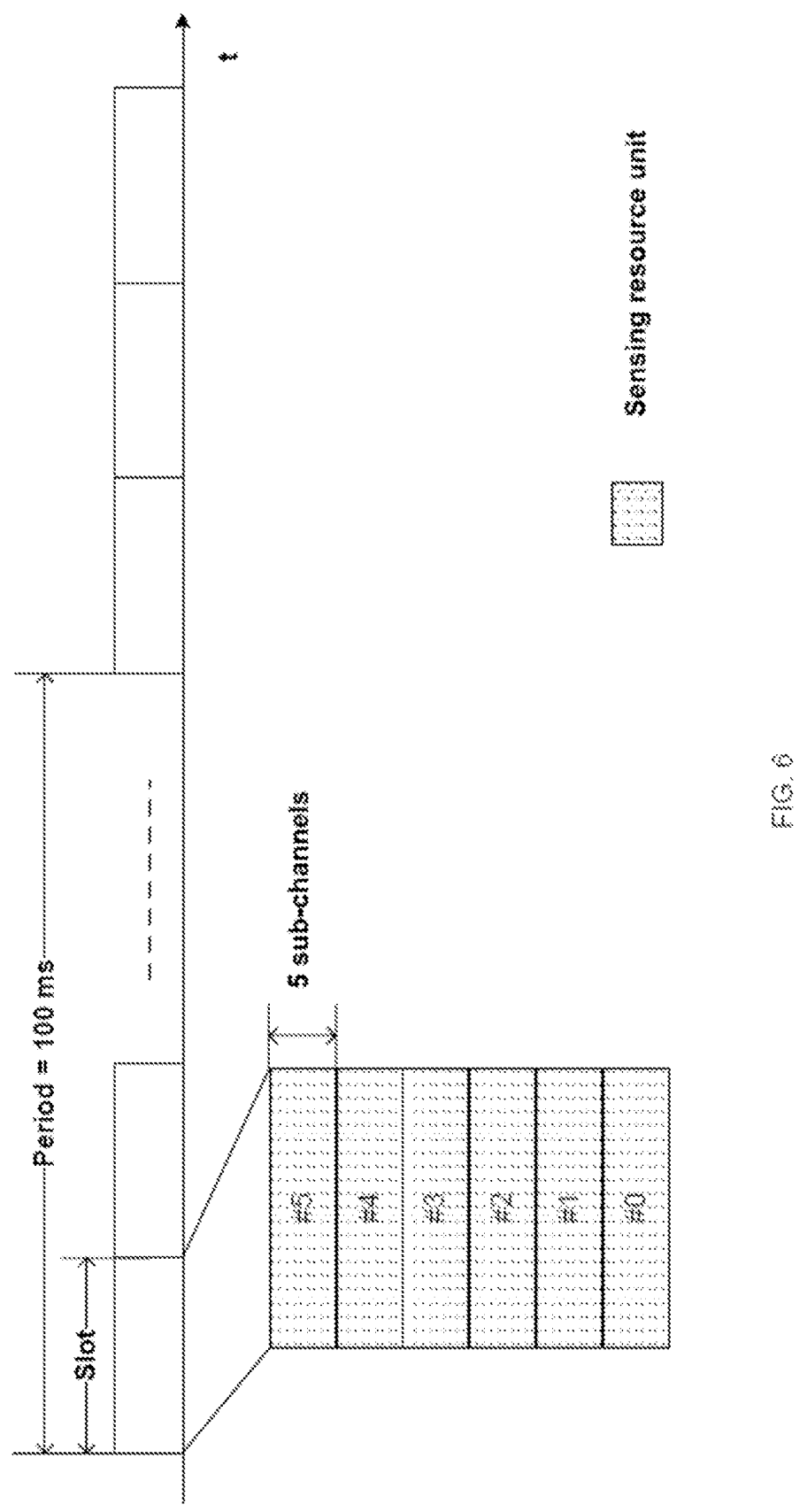

FIG. 5 illustrates a schematic diagram of an exemplary configuration of a sidelink resource pool. In this configuration, a sub-channel is used as a basic RB for PSSCH resources in the frequency domain. Each sub-channel includes k contiguous RBs, where k is an integer. A PSSCH resource may include one or more sub-channels. Within each sub-channel, there is a PSSCH resource which occupies several symbols and RBs.

In the present disclosure, the assigned number of sub-channels may be bundled as a PSSCH resource unit during the sensing process. In some embodiments, the candidate resource size may be determined according to the data packet size of the first UE.

The priority may indicate the data priority of the first UE. The priority may be used by the second UE during sensing process to determine whether a resource may be selected as a candidate resource, or whether that resource may be reserved for a resource to be transmitted, instead of a candidate resource.

The RSRP threshold may set the power threshold of PSSCH DMRS during the sensing process. In some embodiments, the RSRP threshold may be determined by the first UE.

The retransmission number may indicate the potential retransmission attempts of one data packet of the first UE. In some embodiments, the retransmission number may be the maximum number of retransmission attempts for a data packet.

The retransmission interval may indicate the slot interval between two adjacent transmissions of the same data packet. The quantity of candidate resources in a resource set may indicate the number or ratio of resources that may be selected in one resource set. In situations where the quantity of candidate resources in a resource set is a number, the second UE may select the indicated number of candidate resources to be included in a resource set. In situations where the quantity of candidate resources in a resource set is a ratio, the second UE may select candidate resources out of all available resources to achieve the assigned ratio. In some embodiments, the second UE may select an assigned number or ratio of PSSCH resources as candidate resources in a resource set. The PSCCH resources corresponding to the selected PSSCH resources may also be contained in the resource set.

The quantity of resources for one service indicates the quantity of resources which can be used for data packets of a same service. For example, for semi persistent scheduling (SPS) services indicate the quantity of resources for multiple data packets with a certain period.

The time window indicates the slots in the time-domain corresponding to the candidate resources.

In some embodiments, more than one set of sensing parameters may be in the information to form a resource set report. In these situations, the sensing parameter sets may be marked as a sensing parameter set list. In a sensing parameter set list, each sensing parameter has a unique index. By indicating the sensing parameter set index, the UEs may identify the corresponding sensing parameter set in the sensing parameter set list.

In the case that multiple sensing parameter sets are configured, the second UE may perform sensing and select candidate resource(s) respectively, determining multiple resource sets according to the sensing parameter sets. Further, the resource sets may be marked as a resource set list. In a resource set list, each resource has a unique index. By indicating the resource set index, the UEs may identify the corresponding resource sets in the resource set list. In some embodiments, the resource set index has a one-to-one relationship with the sensing parameter set index. For example, the second UE may perform sensing according to sensing parameter set index #k, and composes the candidate resources selected based on the sensing parameters into the resource set index #k.

In some embodiments, the resource set index may be implicitly identified with the corresponding sensing parameter set index, i.e. there is no resource set index. In these situations, the reported resource set may correspond with the sensing parameter index.

6. Exemplary Embodiment #2

FIG. 6, illustrates an example implementation of a second UE, a Rx UE, performing sensing on an assigned resource pool according to indicated sensing parameters, in accordance with exemplary embodiment #2 of the present disclosure. In the present example, the first UE, a TX UE, indicates a configuration with the configuration of one sensing parameter set. According to the configuration, the first UE indicates the sensing parameters as: candidate resource period=100 ms, candidate resource size=5 sub-channels, priority level=3, retransmission number=0 (i.e., no retransmissions), and quantity of candidate resources in a resource set=4.

The second UE receives the configuration from the first UE and obtains the configuration of the sensing parameters. Then, the second UE performs sensing on the assigned resource pool using the indicated sensing parameters. According to FIG. 6, the second UE sets 5 sub-channels as a sensing resource unit with a 100 ms period. By sensing on the resource pool based on the sensing resource unit and the priority level, the second UE selects 4 candidate resources with better channel quality to be included in the resource set.

7. Exemplary Embodiment #3

In one example, a first UE, a Tx UE, indicates a configuration with the configuration of a sensing parameter set list which includes two sensing parameter sets. According to the configuration, the sensing parameter set index #0 and #1 have independent configurations of sensing parameters. For the index #0 sensing parameter set, the set of sensing parameters includes: candidate resource period=100 ms, candidate size=5 sub-channels. For the index #1 sensing parameter set, the set of sensing parameters includes: candidate resource period=0; candidate resource size=10 sub-channels.

A second UE may receive the configuration and obtain the configuration of the sensing parameter set lists. Then, the second UE may perform sensing on the assigned resource pool using the sensing parameters of each sensing parameter set respectively. According to set index #0, the second UE sets 5 sub-channels as a sensing resource unit with 100 ms period and selects candidate resources to compose the resource set. According to set index #1, the second UE sets 10 sub-channels as a sensing resource unit and selects candidate resources to compose the resource set #1.

8. The Configuration of the Resource Set Report Format

Referring to FIG. 2, the information to form a resource set report may include the configuration of the resource set report format. A resource set report format may include at least one of the following: the required resource set and/or the transmission type of resource set report.

The first UE may indicate the configuration of resource set report formats through RRC signals, SCI, and/or MAC layer signaling (e.g., MAC CE) to trigger the resource set report process. In some embodiments, the first UE may indicate the resource set report format in the $1^{st}$ stage SCI. For example, using the reserved bit(s) in the first stage SCI to indicate the resource set report format index. In some embodiments, the first UE may indicate the resource set report format in the $2^{nd}$ stage SCI. For example, defining a new 2' stage SCI format to indicate one or more resource set report format indices, or to indicate the required resource set and the type of resource set report.

In some embodiments, more than one resource set report format may be configured. In these situations, the set report formats may be marked as a resource set report format list. In a resource set report format list, each resource set report format has a unique index. By indicating the resource set report format index, the UEs may identify the corresponding resource set format report in the resource set report format list. In some embodiments, multiple resource sets are indicated in a resource set report format and the type of the resource set report may be configured for each resource set respectively.

Where the resource set report format indicates a required resource set, the second UE may report the specified resource set. To indicate the required resource set, the resource set index may be used to identify the target resource set(s), or, a bitmap sequence may be used to indicate the target resource sets in a resource set list one-by-one. In some embodiments, the required resource set may use one bit to indicate whether or not that required resource set needs to be reported to the first UE.

Where the resource set report format includes the transmission type of the resource set report, the second UE may send a resource set report periodically or by one-shot. In the situation where the resource set report is configured to be reported periodically, the second UE may send the assigned resource set report with the specified period. Between periods, the second UE may update the resource set report based on latest sensing results. In the situation where the resource set report is configured as one-shot reporting, the second UE may send the assigned resource set report for one time.

In some embodiments, multiple resource sets are indicated in a resource set report format, the type of resource set report may be configured for each resource set respectively.

9. Exemplary Embodiment #4

In one example, a first UE, a Tx UE, indicates a configuration to a second UE, a Rx UE, through RRC signaling, the configuration indicating the configuration of the resource set report format. In this example, the first UE assigns a bitmap sequence with five bits to indicate five corresponding resource sets (i.e., there is a one-to-one mapping relationship between the bitmap sequence and the related resource sets). The type of resource set report is configured as periodical reporting with period=200 ms.

According to the configuration, the second UE may report the resource set indicated by the bitmap with period=200 ms. For example, for the bitmap marked as "11000", the second UE may report the resource set index #0 and #1. The second UE may update the selected resource sets based on the latest sensing results, and report the updated resource sets in the next reporting period.

10. Exemplary Embodiment #5

In one example, a first UE indicates a configuration to the second UE through RRC signaling, the configuration indicating the configuration of the resource set report format list. In the resource set report format list, there are four resource set report formats: index #0, #1, #2 and #3. For each resource set report format, the required resource set and type of resource set report are indicated.

The first UE indicates a resource set report format index, for example, index #1, to the second UE in SCI. Resource set report format index #1 may indicate to report resource set index #0 with period=200 ms. Thus, the second UE may report the resource set index #0 with period=200 ms. In another example, the first UE may indicate the resource set report format index #0, where resource set report format index #0 indicates that the second UE may report all the resource sets by one shot. Thus, the second UE may report all of the resource sets one time.

11. The Configuration of the Resources for the Resource Set Report

Referring to FIG. 2, the information to form a resource set report may include the configuration of resources for the resource set report. The configuration of resources for the resource set report may indicate one or more SL resources for carrying the resource set report. In response, the second UE may send the resource set report to the first UE on SL (i.e., using SL resources to transmit the resource set report). The first UE may allocate SL resources to bear the resource set report. The indicated resources for the resource set report may be PSCCH and/or PSSCH resources.

In one embodiment, the configured resources for the resource set report may be one-shot resources which contain one or more resources for reporting resource set reports one time. In other embodiments, the configured resources for the resource set report may be periodical resource which contain resource with certain periods for periodical resource set reports.

The first UE may indicate the configuration of the resources for the resource report through RRC signaling and/or SCI. By using RRC signaling, the configured grant may be used to assign the resource for the resource set report, including configured grant type 1 and/or type 2. By using SCI, the first UE may indicate the resource for the resource set report in the $1^{st}$ stage SCI and/or $2^{nd}$ stage SCI. In some embodiments, by using SCI, the first UE may indicate a PSSCH retransmission resource of its data packet to be used as the resource for the resource set report.

12. Exemplary Embodiment #6

In one example, a first UE, a Tx UE, indicates a configuration to a second UE, an Rx UE, through SCI, the configuration indicating the configuration of resources for the resource set report. In the $1^{st}$ stage SCI, PSCCH and relevant PSSCH are assigned to carry the resource set report for one-shot transmission. In other words, the indication of the configuration using SCI can be seen as a trigger signal where the first UE triggers the second UE to start the resource set report process. The second UE may bear the required resource set report on the assigned resource and send the resource set report to the first UE.

13. Exemplary Embodiment #7

In one example, a first UE indicates a configuration to the second UE through RRC signaling. The configuration indicates the configuration of the resources for the resource set report. In this example, configured grant type 1 may be used to schedule the resources for transmission. By using configured grant type 1, the first UE indicates a set of periodical PSSCH resources as the resources for the resource set report. Specifically, the configured grant type 1 signal assigns one sub-channel with 500 ms period to be used for reporting the resource set report periodically. Thus, the second UE may report the required resource set report on the assigned resource to the first UE with period of 500 ms.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; how- ever, as would be apparent to one of ordinary skill in the art, two or more modules may be combined to form a single module that performs the associated functions according embodiments of the present solution.

Additionally, memory or other storage, as well as com- munication components, may be employed in embodiments of the present solution. It will be appreciated that, for clarity purposes, the above description has described embodiments of the present solution with reference to different functional units and processors. However, it will be apparent that any suitable distribution of functionality between different func- tional units, processing logic elements or domains may be used without detracting from the present solution. For example, functionality illustrated to be performed by sepa- rate processing logic elements, or controllers, may be per- formed by the same processing logic element, or controller. Hence, references to specific functional units are only ref- erences to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
transmitting, by a first wireless communication device to a second wireless communication device, information required to form a resource set report, the required information comprising a first configuration indicating one or more resource pools from which a set of resources are to be selected by the second wireless communication device, and a second configuration comprising one or more sets of sensing parameters, the set of sensing parameters used by the second wireless communication device to obtain measurements relating to sidelink resource sensing and to determine at least one of signal strength, resource usage status, or suit- ability of the sets of resources selected by the second wireless communication device using the first configu- ration,
wherein each of the one or more sets of sensing param- eters includes at least a reference signal received power threshold, a number of retransmissions, and a quantity of resources for one service; and
receiving, by the first wireless communication device from the second wireless communication device, the resource set report indicating the set of resources, wherein the set of resources are selected according to the first configuration of the required information received from the first wireless communication device, and the resource set report includes the measurements sensed by the second wireless communication device according to the second configuration.

2. The wireless communication method of claim 1, wherein the one or more resource pools are indicated by respective indices of a list included in the first configuration.

3. The wireless communication method of claim 1, wherein the one or more sets of sensing parameters are indicated by respective indices of a list included in the second configuration.

4. The wireless communication method of claim 1, wherein the required information includes a third configu- ration indicating one or more formats of the resource set report.

5. The wireless communication method of claim 4, wherein each of the one or more formats of the resource set report includes an indication of at least one of:
one or more resource set that are required to be included in the resource set report; or
a transmission type of the resource set report.

6. The wireless communication method of claim 5, wherein the transmission type of the resource set report includes at least one of:
a periodic transmission type; or
a one-time transmission type.

7. The wireless communication method of claim 4, wherein the one or more formats of the resource set report are indicated by respective indices of a list included in the third configuration.

8. The wireless communication method of claim 1, wherein the required information includes a fourth configu- ration indicating one or more resources assigned for trans- mitting the resource set report.

9. The wireless communication method of claim 1, wherein each of the one or more sets of sensing parameters further include at least one of:
a time-domain period of one or more resources that are required to be included in the set of resources;
a frequency-domain size of the one or more resources that are required to be included in the set of resources;
an interval of retransmission;
a quantity of resources in the set of resources; or
a time window.

10. A first wireless communication device, comprising:
At least one processor configured to:
transmit, via a transceiver to a second wireless com- munication device, information required to form a resource set report, the required information com- prising a first configuration indicating one or more resource pools from which a set of resources are to be selected by the second wireless communication device, and a second configuration comprising one or more sets of sensing parameters, the set of sensing parameters used by the second wireless communi- cation device to obtain measurements relating to sidelink resource sensing and to determine at least one of signal strength, resource usage status, or suitability of the sets of resources by the second wireless communication device using the first con- figuration,
wherein each of the one or more sets of sensing parameters includes at least a reference signal received power threshold, a number of retransmis- sions, and a quantity of resources for one service; and
receive, via the transceiver from the second wireless communication device, the resource set report indi- cating a set of resources, wherein the set of resources are selected according to the required information received from the first wireless communication device, and the resource set report includes the measurements sensed by the second wireless communication device according to the second configuration.

11. The wireless communication device of claim 10, wherein the one or more resource pools are indicated by respective indices of a list included in the first configuration.

12. The wireless communication device of claim 10, wherein the one or more sets of sensing parameters are indicated by respective indices of a list included in the second configuration.

13. The wireless communication device of claim 10, wherein the required information includes a third configuration indicating one or more formats of the resource set report.

14. The wireless communication device of claim 13, wherein each of the one or more formats of the resource set report includes an indication of at least one of:

one or more resource set that are required to be included in the resource set report; or a transmission type of the resource set report.

15. The wireless communication device of claim 14, wherein the transmission type of the resource set report includes at least one of:

a periodic transmission type; or a one-time transmission type.

16. The first wireless communication device of claim 10, wherein each of the one or more sets of sensing parameters further include at least one of:

a time-domain period of one or more resources that are required to be included in the set of resources;

a frequency-domain size of the one or more resources that are required to be included in the set of resources;

an interval of retransmission;

a quantity of resources in the set of resources; or a time window.

\* \* \* \* \*